United States Patent [19]

Yamauchi

[11] Patent Number: 4,951,509
[45] Date of Patent: Aug. 28, 1990

[54] FLUID-PRESSURE DETECTOR
[75] Inventor: Toshio Yamauchi, Otsu, Japan
[73] Assignee: Nissho Corporation, Osaka, Japan
[21] Appl. No.: 379,317
[22] Filed: Jul. 13, 1989
[30] Foreign Application Priority Data
Aug. 22, 1988 [JP] Japan .................................. 63-208865
[51] Int. Cl.⁵ ............................................. G01L 7/02
[52] U.S. Cl. ........................................ 73/730; 73/756
[58] Field of Search ........................ 73/730, 729, 756; 178/672

[56]   References Cited
U.S. PATENT DOCUMENTS

| 2,420,148 | 5/1947 | Ostergren | 73/730 |
| 2,862,521 | 12/1958 | Fenoglio | 73/729 |
| 3,315,534 | 4/1967 | Whippo | 73/729 |
| 3,982,437 | 9/1976 | Sekizawa | 73/730 |
| 4,245,508 | 1/1981 | Andresen, Jr. | 73/729 |

Primary Examiner—Donald O. Woodiel
Attorney, Agent, or Firm—Armstrong, Nikaido, Marmelstein, Kubovcik & Murray

[57]   ABSTRACT

A fluid-pressure detector comprising a pillow-like body capable of expanding and shrinking depending on pressure of fluid flowing in the pillow-like body, a detecting means for detecting an amount of expansion or shrinkage of the pillow-like body, and a connecting means for detachably connecting a detecting portion of the detecting means to an outer surface of the pillow-like body. Fluid pressure can be detected continuously and accurately both in the case of positive pressure and in the case of negative pressure. The detecting means is detachable from the pillow-like body, so that only the pillow-like body can be discarded while leaving the expensive detecting means as it is.

3 Claims, 4 Drawing Sheets

FLUID-PRESSURE DETECTOR

BACKGROUND OF THE INVENTION

The present invention relates to a fluid-pressure detector, and more particularly to a disposable fluid-pressure detector used in a fluid-circulating line.

As an example of this kind of fluid-circulating line, there is known a blood line provided in a so-called dialysis system or plasma-separating system. In such blood line, there has been generally used a pressure-detecting chamber 10 as a fluid-pressure detector for detecting the pressure of flowing blood FIG. 4 shows a schematic structure of the pressure-detecting chamber 10.

The pressure-detecting chamber 10 has a tubular closed container 11 made of synthetic resin such as soft vinyl chloride. Tubes 12 for flowing blood therein are connected to both upper end and lower end of the closed container 11. A monitoring tube 13 is also connected to the upper end of the closed container 11. A pressure gauge (not shown) is attached to an opening end of the monitoring tube 13. That is, in this pressure-detecting chamber 10, blood which flows in the tube 12 is contained in the lower portion of the closed container 11, and the change in pressure of air in a closed room 14 over the blood B contained in the closed container 11 is detected by means of the pressure gauge. Thus, the pressure of blood flowing in the tube 12 is detected through the pressure of air in the closed room 14.

In the above-mentioned pressure-detecting chamber 10, a pressure-detecting portion communicates with the inside of the chamber since the blood pressure is detected through the air in the closed container 11. Accordingly, it is necessary to provide means for preventing bacteria such as a filter for preventing bacteria between the pressure-detecting portion and the chamber 10. Further, it is necessary to provide means for detecting a blood level in the chamber 10 since there is a danger that air in the chamber 10 enters the blood line by the continuous negative pressure. Still further, the chamber 10 is a relatively large part having a volume of 10 to 30 ml, so that there is a disadvantage that the placement or positioning of the chamber requires a large space.

In order to solve the above-mentioned disadvantages, there is proposed a fluid-pressure detector of which side sectional view is shown in FIG. 5. The fluid-pressure detector has a pillow-like body 21 which is made expandable. Tubes 22 for flowing blood which constitutes a blood line are connected to both ends of the pillow-like body 21. A detecting means 23 such as a strain gauge capable of detecting the amount of expansion or shrinkage of the pillow-like body 21 is fixedly placed outside the pillow-like body 21. A detecting portion 23a of the detecting means 23 is so arranged as to directly contact the outer surface of the pillow-like body 21. Since the blood line is discarded after being used one time, the pillow-like body 21 connected to the blood line and the expensive detecting means 23 are not connected to each other, i.e. are separately placed. According to the fluid-pressure detector 20, there can be effectively solved disadvantages caused by detecting blood pressure through air as in the above-mentioned pressure-detecting chamber 10.

In the fluid-pressure detector 20, the pillow-like body 21 and the detecting means 23 are not connected to each other Accordingly, the pressure of blood can be accurately detected so long as the pressure is positive. However, the continuous and accurate detection of the pressure of blood cannot be carried out since the outer surface of the pillow-like body 21 comes off from the detecting portion 23a of the detecting means when the pressure of blood becomes negative, whereby the pillow-like body 21 shrinks beyond the projection limit of the detecting portion 23a of the detecting means 23. Negative pressure can of course be detected if the pillow-like body 21 and the detecting portion 23a of the detecting means 23 are connected to each other. In that case, however, the detecting means 23 is discarded when the blood line including the pillow-like body 21 is discarded. The discard of expensive detecting means 23 is very uneconomical.

The present invention was made to solve the above-mentioned drawback, and it is an object of the present invention to provide a fluid-pressure detector capable of improving the accuracy of detection and reducing the space required for the placement of the detector. The detector of the present invention further enables continuous and accurate detection of the fluid pressure even when the fluid pressure becomes negative, and enables the discard of the pillow-like body connected to the fluid-circulating line with leaving the detecting means as it is.

SUMMARY OF THE INVENTION

In accordance with the present invention, there is provided a fluid-pressure detector comprising: a pillow-like body capable of expanding and shrinking depending on pressure of fluid flowing in the pillow-like body; a detecting means for detecting an amount of expansion or shrinkage of the pillow-like body, the detecting means being fixedly placed outside the pillow-like body; and a connecting means for detachably connecting a detecting portion of the detecting means to an outer surface of the pillow-like body.

In the detector of the present invention, a filter for preventing bacteria is not required since the pressure of fluid flowing in the pillow-like body is detected by directly detecting the amount of expansion or shrinkage of the pillow-like body by means of a detecting means and the pillow-like body does not communicate with the detecting means. Further, means for detecting fluid level is not required since no air exists between the fluid and detecting means. Still further, both a filter for preventing bacteria and means for detecting fluid level are not required and the volume of chamber can be reduced as small as not more than 5 ml, so that the whole detector can be miniaturized and space required for the placement of the detector can be reduced. Moreover, the pressure of fluid can be detected continuously and accurately regardless of whether it is positive or negative, since a detecting portion of the detecting means is detachably connected to an outer surface of the pillow-like body by means of a connecting means. The detecting means can be detached from the pillow-like body connected to a fluid-circulating line after the fluid pressure is detected.

DETAILED DESCRIPTION

Next, a fluid-pressure detector of the present invention is explained in detail based on the accompanying drawings wherein the detector is applied to a blood line which is an example of fluid-circulating lines.

Figure 1:
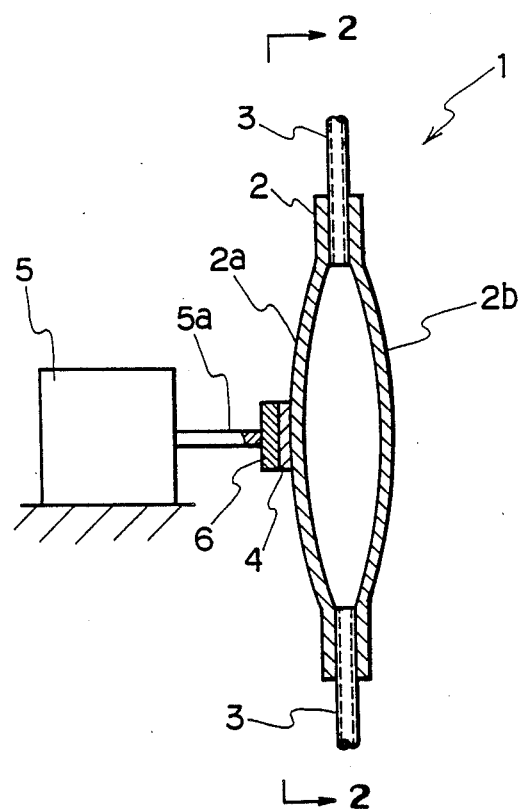
FIG. 1 is a schematic side sectional view of an embodiment of a fluid-pressure detector of the present invention.
Figure 2:
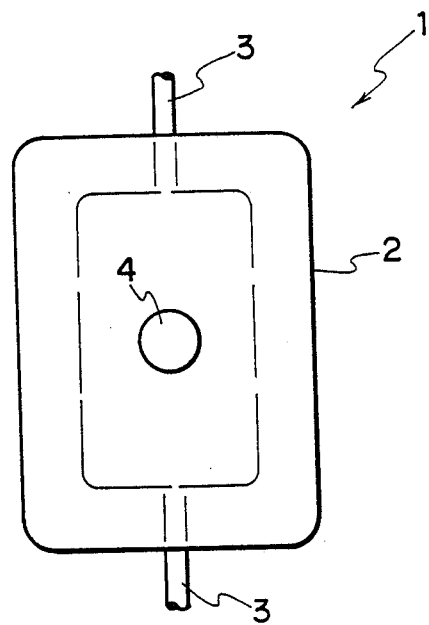
FIG. 2 is a front view of the embodiment along the line II—II of FIG. 1.
Figure 3:
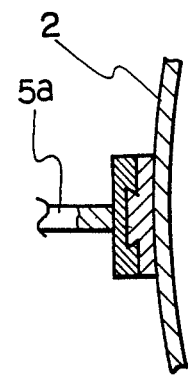
FIG. 3 is a schematic side sectional view of another embodiment of a fluid-pressure detector of the present invention.
Figure 4:
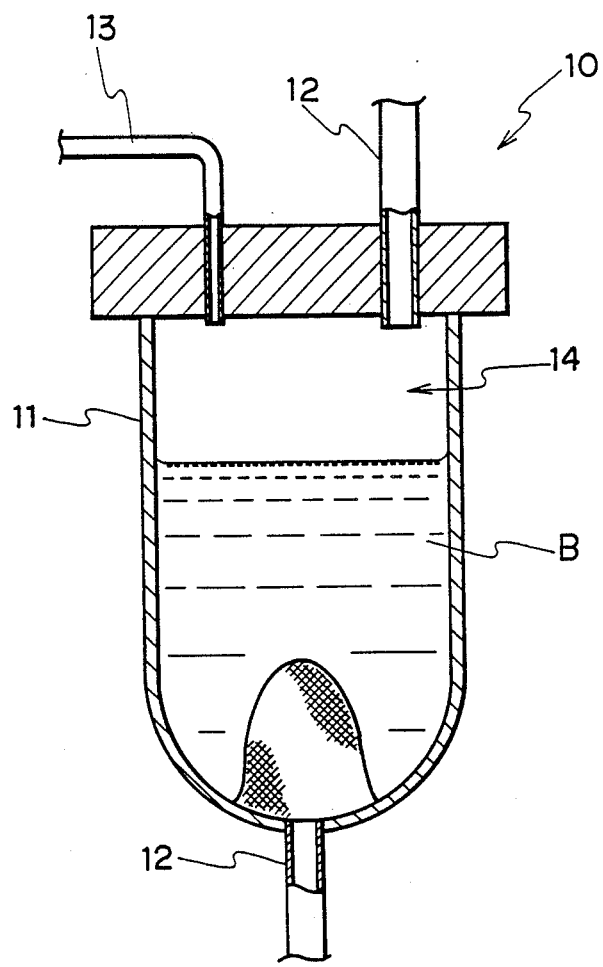
FIG. 4 is a schematic sectional view of a conventional pressure-detecting chamber.
Figure 5:
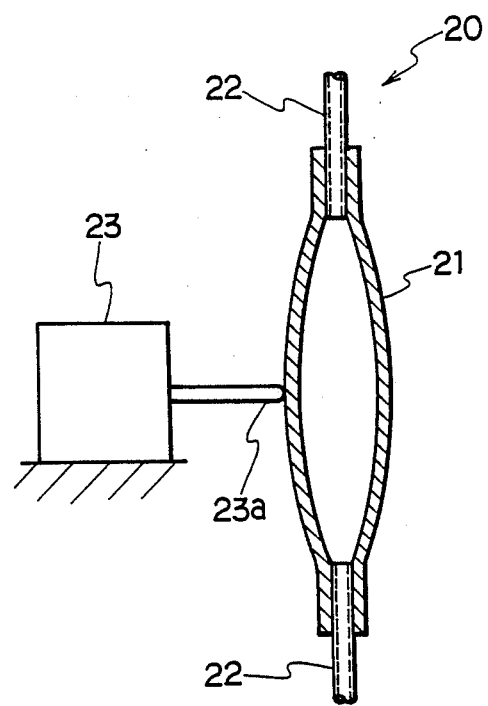
FIG. 5 is a schematic side sectional view of a main portion of a conventional fluid-pressure detector.

In FIG. 1 to 2, numeral 1 is a fluid-pressure detector with a pillow-like body 2 capable of expanding and shrinking depending on the pressure of blood flowing in the pillow-like body 2. The pillow-like body 2 is composed of a pair of approximately rectangular sheet 2a, 2b made of synthetic resin such as soft vinyl chloride. Two sheets 2a, 2b are adhered to each other at their peripheries. A tube 3 for flowing blood is connected to each end of the pillow-like body 2. An iron plate 4, an example of magnetic material, is attached by adhesives to an approximately central position of an outer surface of at least one of sheets 2a, 2b constituting the pillow-like body. In the embodiment shown in FIG. 1, the iron plate 4 is attached to the left sheet 2a.

A detecting means 5 such as a strain gauge or a differential transformer which detects expansion or shrinkage of the pillow-like body 2 is fixedly provided at a prescribed position outside the pillow-like body 2. A magnet 6 for attracting the iron plate 4 adhered to the outer surface of the pillow-like body 2 is provided at a tip of a detecting portion 5a of the detecting means 5. In the present embodiment, a connecting means which directly connect the outer surface of the pillow-like body 2 to the detecting portion 5a of the detecting means 5 is composed of the magnet 6 and the iron plate 4 closely adhered to the magnet 6 by magnetic attraction thereof. Since the connecting means in the present invention is so designed as to be detachable by the use of iron plate 4 and magnet 6, the magnet 6 is left at the tip of the detecting portion 5a as it is if the pillow-like body 2 connected to the blood line is discarded after being used one time.

In the above explanation, a connecting means is composed of the iron plate 4 and the magnet 6. It should be noted, however, that a connecting means in the present invention is not limited thereto. For example, a connecting means might be composed of a pair of connecting members one of which is attached to an outer surface of the pillow-like body and the other of which is attached to a tip of the detecting portion 5a of the detecting means 5. Both connecting members are connected to each other by dovetail joint. Connecting members connected to each other by screw joint can also be employed.

The detector of the present invention can be applied not only to a line circulating body fluid other than blood but also to other fluid-circulating lines.

According to the detector of the present invention, no air exists between fluid and a detecting means unlike in the case of conventional detector, since the pressure of fluid flowing in a pillow-like body is detected by directly ditecting the expansion or shrinkage of the pillow-like body by the detecting means. Accordingly, accuracy of detection of fluid pressure can be improved, and the whole detector can be miniaturized, whereby the space required for the placement of the detector can be reduced.

Further, the fluid pressure can be detected continuously and accurately not only in the case of positive pressure but also in the case of negative pressure, since a detecting portion of a detecting means is detachably connected to an outer surface of the pillow-like body by a connecting means.

Moreover, the detecting means is detachable from the pillow-like body, so that only the pillow-like body which is a part of a fluid-circulating line can be discarded while leaving the expensive detecting means at its attachment position. This results in a saving of cost in the case of a system such as plasma-separating system in which a blood line is exchanged for new one together with the exchange of donor.

What is claimed is:

1. A disposable fluid-pressure detector for use in a blood line, comprising:
    an elongated pillow-like body having an inlet port and an outlet port at axial ends thereof and a flexible wall capable of expanding and shrinking to generate a reciprocal movement in a direction at a right angle to the axial direction thereof in response to a pressure of fluid flowing into the pillow-like body through the inlet port and flowing out through the outlet port;
    a detecting means for detecting an amount of expansion or shrinkage of the pillow-like body, the detecting means being fixedly placed outside the pillow-like body; and
    a connecting means for transferring the reciprocal movement of the flexible wall to the detecting means by detachably connecting a detecting portion extending from the detecting means to an outer surface of the flexible wall such that the pillow-like body can be detached from the detecting means in order to dispose thereof.

2. The disposable fluid-pressure detector of claim 1 wherein the connecting means has a magnet at a distal end of said detecting portion.

3. The disposable fluid-pressure detector of claim 1 wherein the connecting means has a slidably detachable wedge at a distal end of said detecting portion.

* * * * *